United States Patent
Xu et al.

(10) Patent No.: US 11,510,103 B2
(45) Date of Patent: Nov. 22, 2022

(54) METHOD AND APPARATUS FOR LOAD BALANCING IN A CLOUD-RADIO ACCESS NETWORK

(71) Applicant: Nokia Solutions and Networks Oy, Espoo (FI)

(72) Inventors: Lei Xu, Zhejiang (CN); Tao Kong, Zhejiang (CN); Bingquan Xie, Zhejiang (CN); Jiaping Yang, Zhejiang (CN); Hongmei Xu, Zhejiang (CN); Xiaole Sun, Zhejiang (CN); Shuo Zhang, Zhejiang (CN)

(73) Assignees: Nokia Shanghai Bell Co. Ltd., Shanghai (CN); Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/769,637

(22) PCT Filed: Dec. 20, 2017

(86) PCT No.: PCT/CN2017/117512
§ 371 (c)(1),
(2) Date: Jun. 4, 2020

(87) PCT Pub. No.: WO2019/119305
PCT Pub. Date: Jun. 27, 2019

(65) Prior Publication Data
US 2021/0185563 A1 Jun. 17, 2021

(51) Int. Cl.
*H04W 28/08* (2009.01)
*H04W 76/15* (2018.01)
(Continued)

(52) U.S. Cl.
CPC ..... *H04W 28/0842* (2020.05); *H04L 12/4633* (2013.01); *H04L 12/4641* (2013.01);
(Continued)

(58) Field of Classification Search
None
See application file for complete search history.

(56) References Cited

U.S. PATENT DOCUMENTS

2014/0269322 A1* 9/2014 Li ................. H04W 28/08
370/236
2015/0124622 A1 5/2015 Kovvali et al.
(Continued)

FOREIGN PATENT DOCUMENTS

| CN | 105359574 A | 2/2016 |
|---|---|---|
| CN | 105516312 A | 4/2016 |

(Continued)

OTHER PUBLICATIONS

King Lancaster University—Virtualisation of Mobile Core Network Use Case, Jun. 8, 2014 (Year: 2014).*
(Continued)

*Primary Examiner* — Yemane Mesfin
*Assistant Examiner* — Jeff Banthrongsack
(74) *Attorney, Agent, or Firm* — Harrington & Smith

(57) ABSTRACT

Method and apparatus for load balancing in a Cloud-radio access network (C-RAN) are disclosed. A method includes receiving control plane (CP) data associated with a user from a core network or a remote access point; and dispatching the CP data to a first user equipment (UE) virtualized network function component (VNFC) based on a first route.

16 Claims, 12 Drawing Sheets

---

600A

602A

Receiving control plane (CP) data associated with a user from a core network or a remote access point

604A

Dispatching the CP data to a first user equipment(UE) virtualized network function component(VNFC) based on a first route

(51) Int. Cl.
  *H04L 12/46* (2006.01)
  *H04W 36/02* (2009.01)
  *H04W 80/02* (2009.01)
  *H04W 36/00* (2009.01)

(52) U.S. Cl.
  CPC ... *H04W 28/0804* (2020.05); *H04W 28/0958* (2020.05); *H04W 36/0033* (2013.01); *H04W 36/02* (2013.01); *H04W 76/15* (2018.02); *H04W 80/02* (2013.01)

(56) References Cited

U.S. PATENT DOCUMENTS

| | | | |
|---|---|---|---|
| 2016/0205518 | A1 | 7/2016 | Patel et al. |
| 2016/0366009 | A1 | 12/2016 | Bedekar et al. ................. 47/70 |
| 2016/0381662 | A1* | 12/2016 | Wang ................... H04W 12/00 370/329 |
| 2017/0086049 | A1* | 3/2017 | Vrzic .................... H04W 40/00 |
| 2017/0104609 | A1 | 4/2017 | Mcnamee et al. ................. 12/4 |
| 2017/0111274 | A1 | 4/2017 | Bays et al. |
| 2017/0116019 | A1 | 4/2017 | Miller |
| 2017/0134483 | A1 | 5/2017 | Miller |
| 2017/0272380 | A1 | 9/2017 | Rao et al. |
| 2017/0272523 | A1 | 9/2017 | Cillis et al. |

FOREIGN PATENT DOCUMENTS

| | | |
|---|---|---|
| CN | 105681216 A | 6/2016 |
| CN | 106963201 A | 10/2016 |
| CN | 106851738 A | 6/2017 |
| CN | 106937331 A | 7/2017 |
| JP | 2016532403 A | 10/2016 |

OTHER PUBLICATIONS

ETSI GS NFV-SWA 001 V1.1.1 (Dec. 2014), Network Functions Virtualisation (NFV); Virtual Network Functions Architecture, 93 pgs.

ETSI Annex A (normative): NFV ISG PoC Proposal Template, 2014, 6 pgs.

King Lancaster University M Liebsch P Willis J Ryoo Etri D: "Virtualisation of Mobile Core Network Use Case;draft-king-vnfpool-mobile-use-case-01.txt" Virtualisation of Mobile Core Network Use Case; DRAFT-KING-VNFPOOL-MOBILE-USE-CASE-01.TXT, Internet Engineering Task Force, IETF; Standard Workingdraft, Internet Society (ISOC) 4, Rue Des Falaises CH—1205 Geneva, Switzerland, Jun. 8, 2014 (Jun. 8, 2014), pp. 1-14, XP015099466, [retrieved on Jun. 8, 2014].

"Network Function Virtualisation; Use Cases;|GS-NFV-O09v012-clean—Use Cases—Editorial comments", ETSI Draft; GS-NFV-009V012-CLEAN—Use Cases—Editorial COmments, EurOpean TelecOmmunications Standards Institute (ETSI), 650, ROute Des LuciOles; F-06921 Sophia-Antipolis; France,vol. ISG, No. V012,Sep. 3, 2013 (Sep. 3, 2013), pp. 1-54, XP014159597, [retrieved on Sep. 3, 2013]* Section 9. Use Case #5: Virtualisation of Mobile base Station; p. 31-p. 34 *.

* cited by examiner

METHOD AND APPARATUS FOR LOAD BALANCING IN A CLOUD-RADIO ACCESS NETWORK

CROSS REFERENCE TO RELATED APPLICATION

This patent application is a U.S. National Stage application of International Patent Application Number PCT/CN2017/117512 filed Dec. 20, 2017, which is hereby incorporated by reference in its entirety.

TECHNICAL FIELD

Embodiments of the disclosure generally relate to wireless communication, and, more particularly, to method and apparatus for load balancing in a Cloud-radio access network (C-RAN).

BACKGROUND

C-RAN is a novel mobile network architecture where baseband processing is centralized and shared among sites in a virtualized BBU (Building Base band Unit) or user equipment (UE) virtualized network function component (VNFC) Pool. This means that it is able to adapt to non-uniform traffic and utilize resources more efficiently. Due to the fact that fewer UE VNFCs are needed in C-RAN compared to the traditional architecture, C-RAN has also the potential to decrease the cost of network operation, because power and energy consumption are reduced compared to the traditional RAN architecture. New UE VNFC can be added and upgraded easily, thereby improving scalability and easing network maintenance. The UE VNFC Pool can be shared by different network operators, allowing them to rent RAN as a cloud service.

In current C-RAN, UE related control-plane (CP) and user-plane (UP) functionality closely engage with a core network, radio access points and cell specific or central control plane logic etc., which may result in that the procedures of user migration inside C-RAN, UE VNFCs' scale-in/out, rolling upgrade/fall back, load balancing or high availability all have impacts to these "partners" (core network, radio access points, cell specific and central control plane applications) and become much more complex. Therefore, it would be desirable to provide an improved solution for C-RAN.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to a first aspect of the disclosure, it is provided a method for load balancing in a Cloud-radio access network (C-RAN). The method comprises receiving control plane (CP) data associated with a user from a core network or a remote access point; and dispatching the CP data to a first user equipment (UE) virtualized network function component (VNFC) based on a first route.

According to a second aspect of the disclosure, it is provided an apparatus for managing sharing vehicle. The apparatus comprises a processor; and a memory, the memory containing instructions executable by the processor, whereby the apparatus is operative to receive control plane (CP) data associated with a user from a core network or a remote access point; and dispatch the CP data to a first user equipment (UE) virtualized network function component (VNFC) based on a first route.

According to a third aspect of the disclosure, it is provided a computer program product. The computer program product comprises instructions which when executed by at least one processor, cause the at least one processor to receive control plane (CP) data associated with a user from a core network or a remote access point; and dispatch the CP data to a first user equipment (UE) virtualized network function component (VNFC) based on a first route.

According to a fourth aspect of the disclosure, it is provided a computer readable storage medium. The computer readable storage medium comprises instructions which when executed by at least one processor, cause the at least one processor to receive control plane (CP) data associated with a user from a core network or a remote access point; and dispatch the CP data to a first user equipment (UE) virtualized network function component (VNFC) based on a first route.

These and other objects, features and advantages of the disclosure will become apparent from the following detailed description of illustrative embodiments thereof, which are to be read in connection with the accompanying drawings.

DETAILED DESCRIPTION

Figure 1:
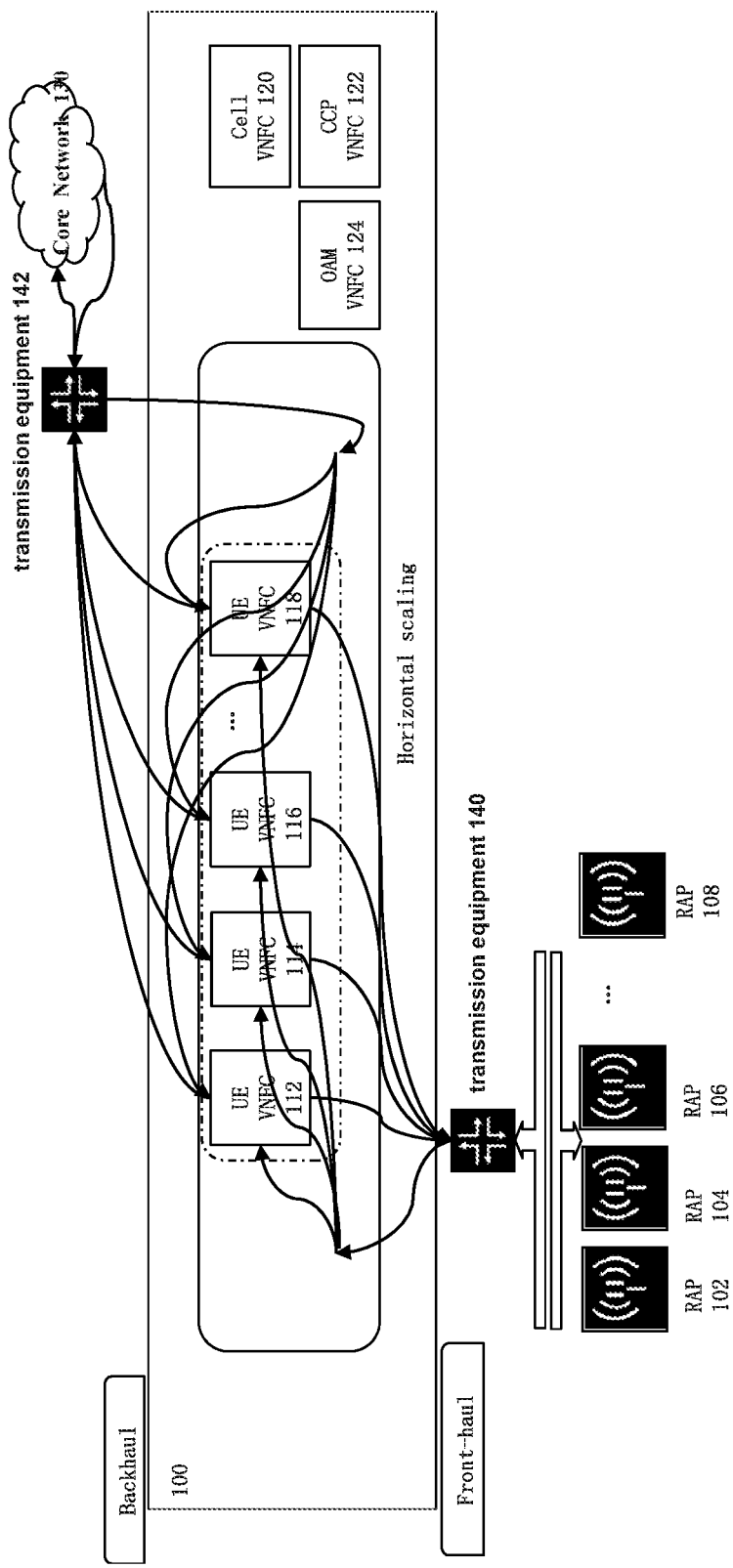
FIG. 1 depicts a schematic LTE system without a load balancer.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless network" or "radio network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device/user equipment (UE) and a network device in the wireless network may be performed according to any suitable generation communication protocols, including, but not limited to, Global System for Mobile Communications (GSM), Universal Mobile Telecommunications System (UMTS), Long Term Evolution (LTE), and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMAX), Bluetooth, and/or ZigBee standards, and/or any other protocols either currently known or to be developed in the future.

The term "network device" refers to a device in a wireless network via which a terminal device accesses the network and receives services therefrom. The network device refers a base station (BS), an access point (AP), or any other suitable device in the wireless network. The BS may be, for example, a node B (NodeB or NB), an evolved NodeB (eNodeB or eNB), or gNB, a Remote Radio Unit (RRU), a radio header (RH), a remote radio head (RRH), a remote access point (RAP), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless network or to provide some service to a terminal device that has accessed the wireless network.

The term "terminal device" refers to any end device that can access a wireless network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless network. Instead, a UE may represent a device that is intended for sale to, or operation by, a human user but that may not initially be associated with a specific human user.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 depicts a schematic LTE system without a load balancer, in which RAN is implemented as C-RAN. In the schematic LTE system, at front-haul, UE VNFCs 112, 114, 116, 118 and RAPs 102, 104, 106, 108 are mesh-connected. When a user is accessed to the LTE radio network through a RAP such as RAP 102, at C-RAN 100, this user can be setup at a UE VNFC such as UE VNFC 112 and RAP 102 communicates with this UE VNFC 112 directly for u-plane or c-plane traffic. Similarly, at backhaul, when a paging for the user comes from a core network 130, a UE VNFC can be selected to setup the user, then this UE VNFC setups GTP (GPRS Tunneling Protocol) tunnel with the core network 130 directly.

Figure 2:
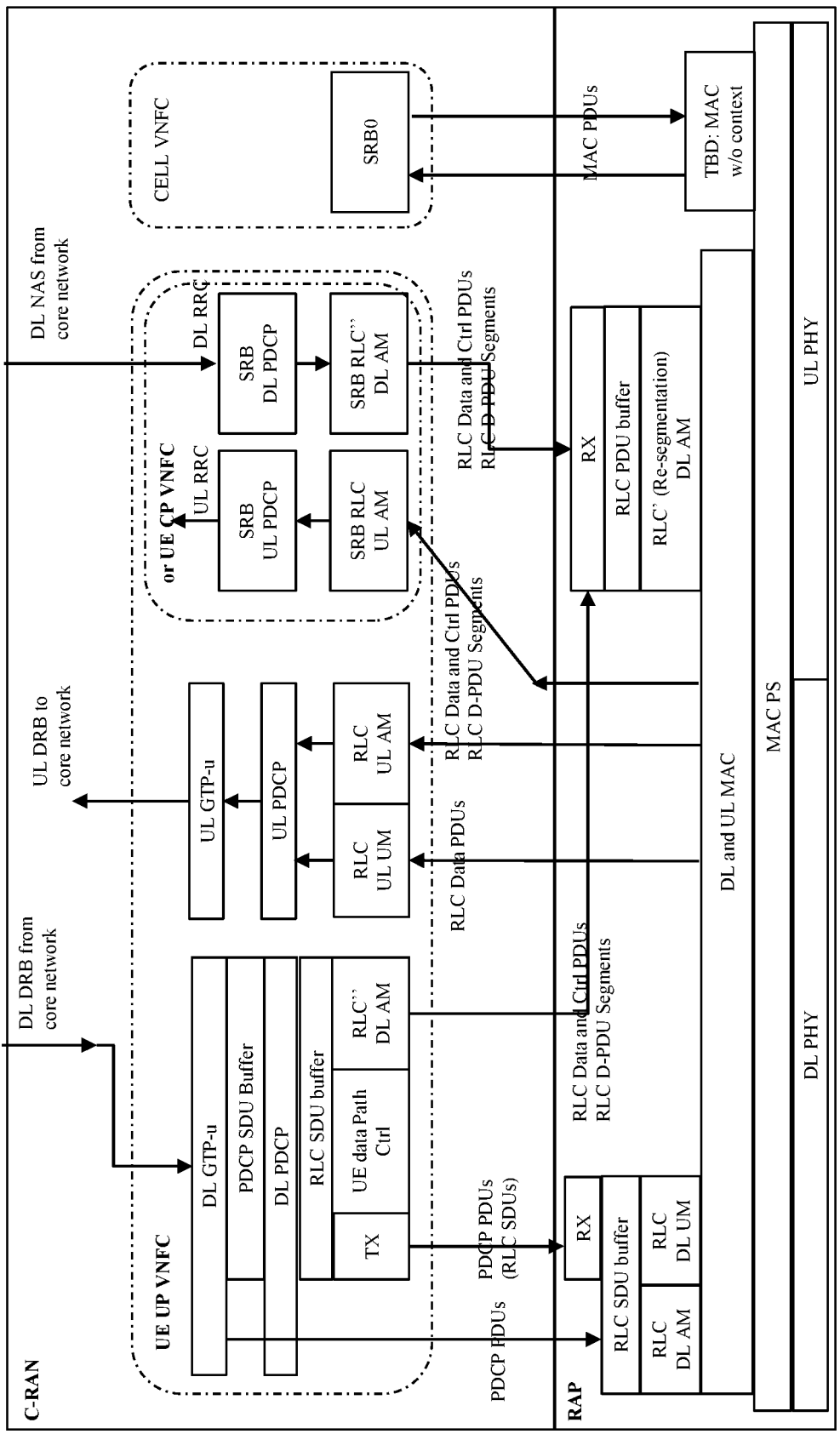
FIG. 2 depicts a schematic protocol stack of the schematic LTE system without a load balancer.

FIG. 1 depicts a schematic protocol stack of the schematic LTE system without a load balancer. As shown in FIG. 2, the traffic from the core network and the RAP is directly sent to the UE CP/UP VNFC. In the C-RAN, UE related CP or UP functionality closely engage with a core network, RAPs and cell specific or central control plane logic etc. There are exposed interfaces between each of these "partners" and UE VNFC. The procedures of user migration inside C-RAN, UE VNFCs' scale-in/out, rolling upgrade/fall back, load balancing or high availability all have impacts to these "partners" (core network, radio access points, cell specific and central control plane applications), to support these procedures, need changes to the UE VNFC, but also need changes in those partners, which is much more complex.

The present disclosure proposes a solution for load balancing in the C-RAN. It may overcome at least one of the drawbacks mentioned above or other drawbacks. It is noted that though the embodiments are mainly described in the context of the LTE system, they are not limited to this but can be applied to any suitable wireless system. Now some exemplary embodiments of the present disclosure will be described below with reference to the figures.

Figure 3:
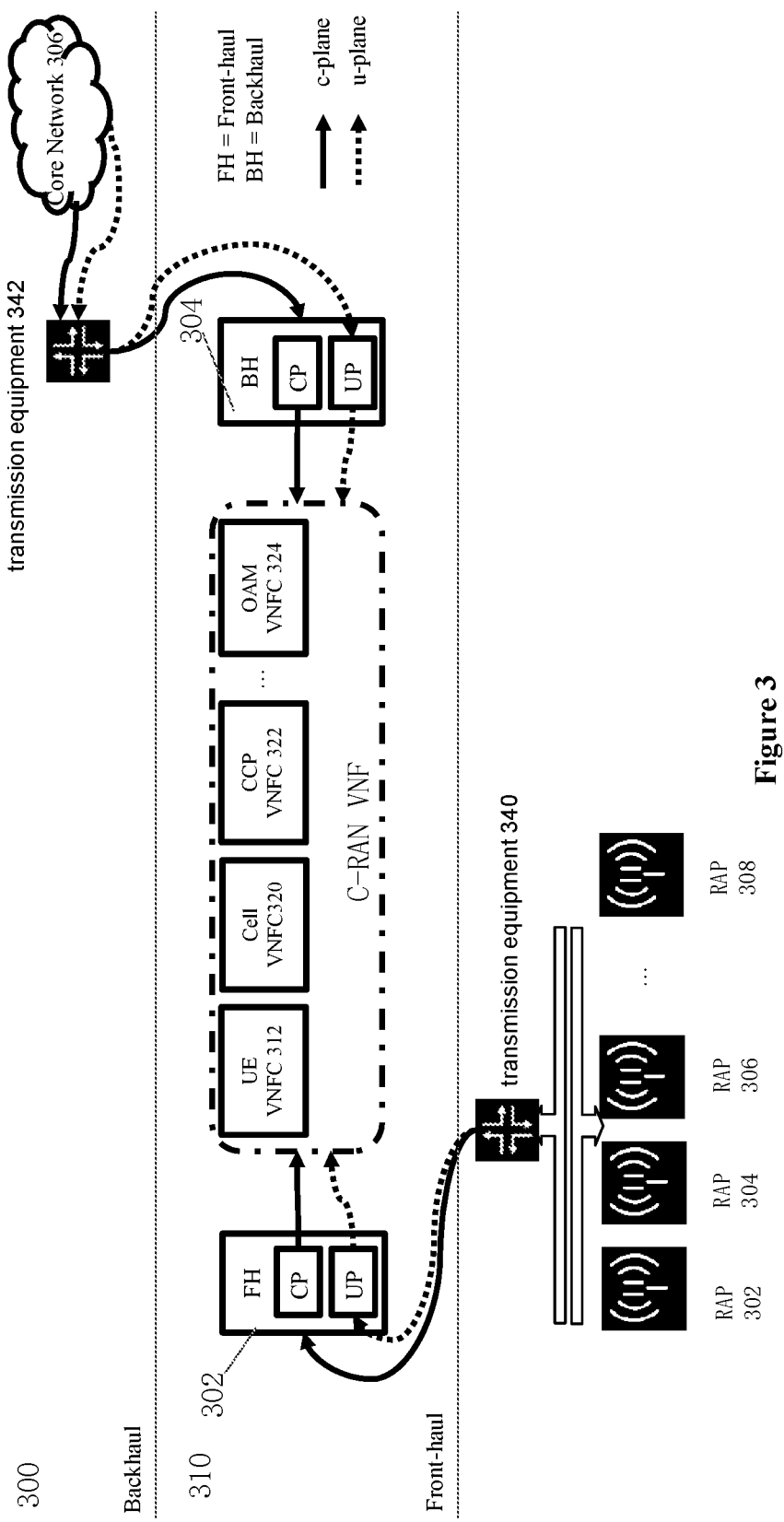
FIG. 3 depicts a schematic system, in which some embodiments of the present disclosure can be implemented.

FIG. 3 depicts a schematic system 300, in which some embodiments of the present disclosure can be implemented. As shown in FIG. 3, the system 300 comprises a C-RAN 310. The C-RAN 310 may refer to a function element on the network side as compared to a terminal device or UE. For example, the C-RAN 310 may be capable to serve terminal devices such as UEs in the system 300. The C-RAN 310 may comprise load balancers 302 and 304 which can receive user plane (UP) data or control plane (CP) data associated with a user from a core network 306 or a remote access point 302, 304, 306, 308 and dispatch the UP data or CP data to a UE VNFC 312 based on a route which may be created based on a load of one or more UE-VNFCs. It is noted that there may be two or more UE VNFCs though only one UE VNFC 312 is shown in FIG. 3. The load balancers 302 and 304 can be a single apparatus though they are depicted as two separate apparatus. The load balancers can be located at an edge of C-RAN. The load balancers can exist as one or more VNFCs or as a middle ware of the C-RAN 310. Load Balancer provides interface to the core network and remote antenna access units. Load Balancer receives c-plane and u-plane traffic from C-RAN outside and dispatch traffic into VNFCs. In addition, the load balancer or components thereof can be located in the core network or RAP. For example, the dispatching functionality of the load balancer may be implemented by a software defined networking (SDN) traffic forwarding element such as vSwitch which will be described in detail hereinafter. The vSwitch may be located in the core network or RAP.

Figure 4:
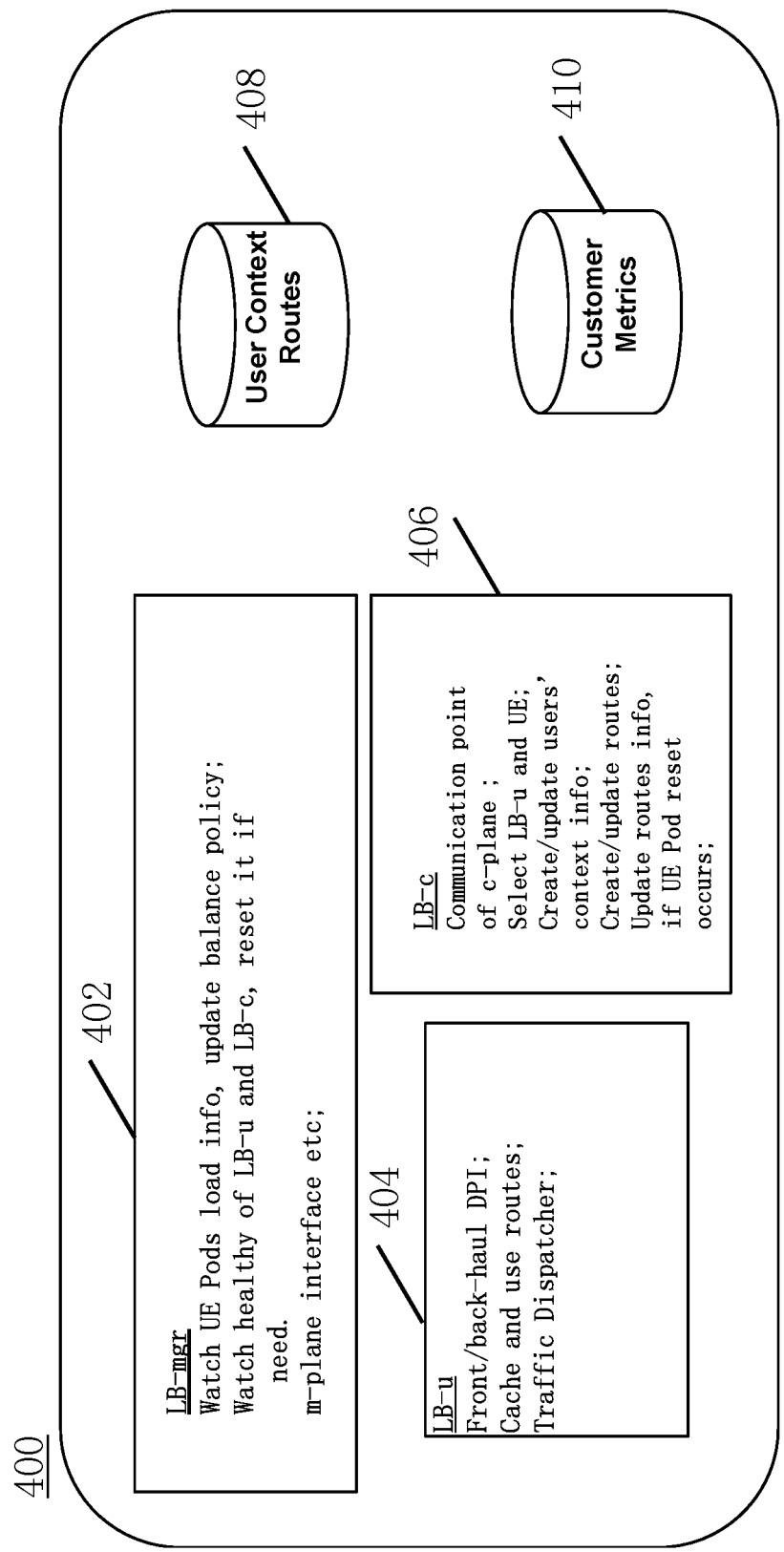
FIG. 4 depicts a schematic load balancer according to an embodiment of the present disclosure.

FIG. 4 depicts a schematic load balancer according to an embodiment of the present disclosure. As shown in FIG. 4, the load balancer 400 comprises a load balancer manager (LB-mgr) 402 which can provide any suitable management functionality. For example, LB-mgr 402 can provide management-plane interface to outside for counters or faults etc.; be responsible to watch the health of the load balancer 400's other components and reset an unhealthy component; read the customer metrics from a database (DB) 410 to watch the load information of the VNFCs; and create a promotion list or update it if such promotion list already exists.

The load balancer 400 further comprises a load balancer control plane (LB-c) 402 which can provide any suitable functionality associated with the control plane. For example, LB-c 406 can act as a messaging communication point for application business logic; based on a promotion list, selects a VNFC to use; keep a session; create routes for traffic dispatch; and save user context into a DB 508. For example, the promotion list may be a list of VNFC loads that are listed in ascending or descending order. Moreover, there may be one or more LB-c 402 though only one LB-c 402 is shown in FIG. 4. For example, LB-c 402 can have horizontal scaling depending on traffic throughput load.

The load balancer 400 further comprises a load balancer user plane (LB-u) 404 which can provide any suitable functionality associated with the user plane. For example, LB-u 404 can dispatch u-plane traffic from RAP or the core network to a correct VNFC, based on the route created by the LB-c 406 and perform deep packet inspection to identify which user owns the packet. In addition, LB-u 404 can be implemented by a SDN vSwitch. Moreover, there may be one or more LB-u 404 though only one LB-u 404 is shown in FIG. 4. For example, LB-u 404 can have horizontal scaling depending on traffic throughput load.

The load balancer 400 further comprises a session DB 408 which may be used to store user static and dynamic contexts information, also the routes information of traffic dispatch and a time-series DB 410 which may be used to store customer metrics of load such as load information of UE VNFCs and LB-u 404. The session DB 408 and the time-series DB 410 can be separate DBs or can be integrated together. Moreover, the session DB 408 and the time-series DB 410 can be implemented by using any suitable DB technology such as Influx DB or Redis DB.

Turn to FIG. 3, the C-RAN 310 may further comprise one or more UE-VNFCs 312, 314, 316, 318. The UE-VNFCs 312, 314, 316, 318 may provide any suitable functionality associated with UE CP and/or UE UP. For example, the UE-VNFC 312 may provide functionality associated with both UE CP and UE UP, the UE-VNFC 314 may provide functionality associated with UE CP or UE UP, or the like. The UE-VNFCs 312, 314, 316, 318 may be implemented by a virtual machine and run with any kind of operating system including, but not limited to, Windows, Linux, UNIX, iOS and their variants.

The C-RAN 310 may further comprise a cell VNFC 320 which may serve at least one RAP. It is noted that there may be a plurality of cell VNFCs 320 each of which serves different RAPs though only one cell VNFC 320 is shown in FIG. 3.

The C-RAN 310 may further comprise a centralized control plane (CCP) VNFC 322 which may provide functionality associated with the control plane of the C-RAN 310; and an operation and maintenance (OAM) VNFC 324 which may provide functionality associated with the OAM of the C-RAN 310. In addition, the C-RAN 310 may further comprise any other suitable components.

The system 300 further comprise one or more RAPs 302, 304, 306, 308. It is well known that a cellular radio system may comprise a network of radio cells each served by the RAP, known as a cell site or base transceiver station. The radio network provides wireless communications service for a plurality of more transceivers (in most cases mobile). The network of RAPs working in collaboration allows for wireless service which is greater than the radio coverage provided by a single RAP. The individual RAP may be connected to the C-RAN through a transmission equipment 340, such as optical transmission device or microwave equipment.

The system 300 further comprise a core network 306 which is a telecommunication network's core part and offers numerous services to the customers who are interconnected by the RAP. For example, in LTE, the core network 306 may comprise Home Subscriber Server (HSS) component, a Packet Data Network (PDN) Gateway (P-GW), a serving gateway (S-GW), a mobility management entity (MME), a Policy Control and Charging Rules Function (PCRF), etc.

Figure 5:
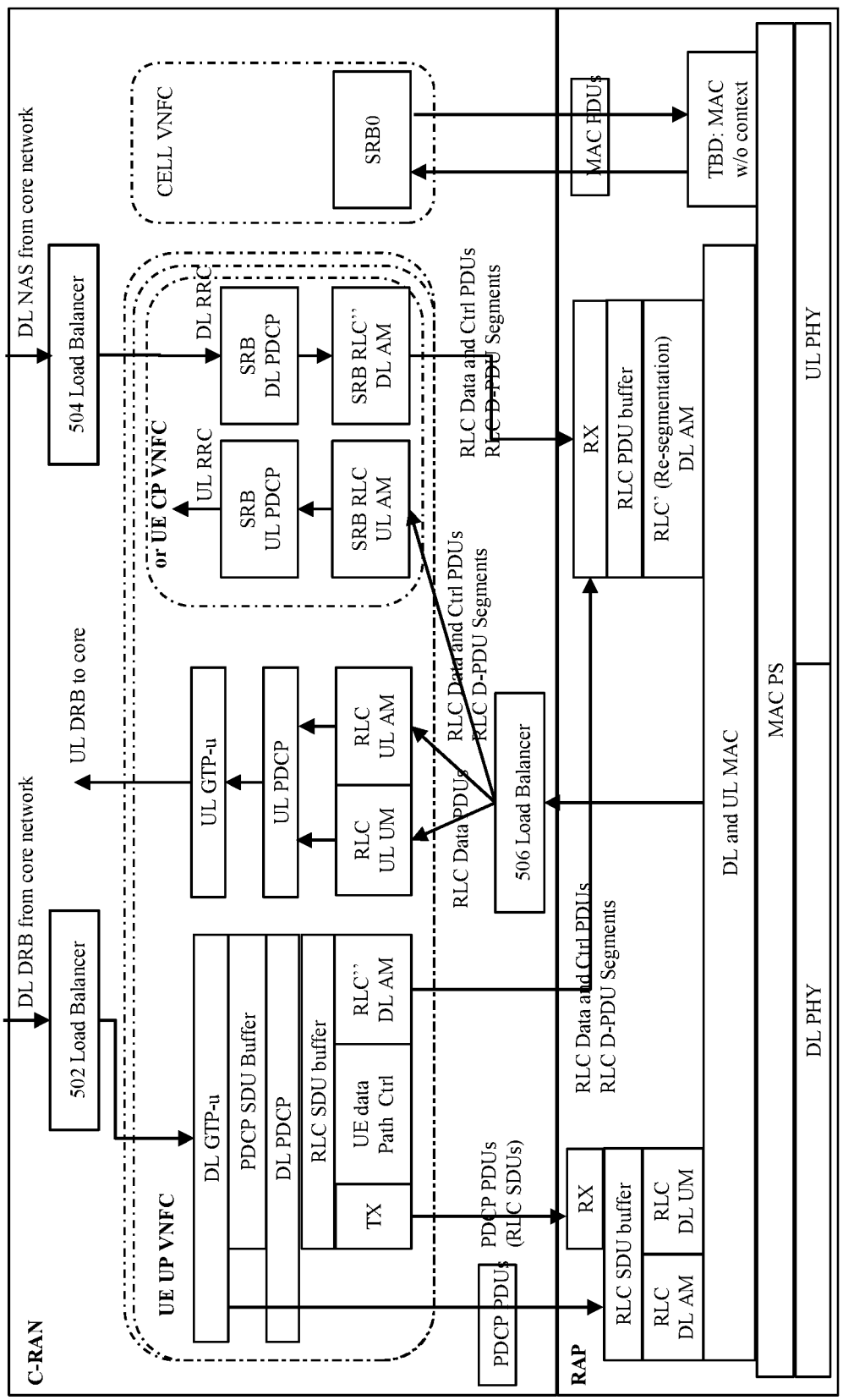
FIG. 5 depicts a schematic protocol stack of a LTE system with a load balancer according to an embodiment of the present disclosure.

FIG. 5 depicts a schematic protocol stack of a LTE system with a load balancer according to an embodiment of the present disclosure. As shown in FIG. 5, the traffic from the core network and the RAP is first sent to the load balancers 502, 504, 506 which may dispatch the traffic to a UE VNFC based on a route, wherein the route may be created based on a load of the one or more UE-VNFCs of the C-RAN. With the load balancers 502, 504, 506, user migrations among UE VNFCs become the load balancer's internal logic, as the load balancer hides user's external connectivity, no tangles with RAP or core network during migration. In addition, thanks to hiding and user migration, the load balancer may make on-demand scaling of UE VNFCs be seamless, the UE VNFCs' scale-out or scale-in are scoped inside the load balancer, no impact to outside RAP or core network etc. Moreover, the load balancer may facilitate UE VNFCs' high availability (N+M) as well. In addition, the load balancer can define an order to do UE VNFCs' rolling upgrade/fallback, without business service downtime. The load balancer may further support a concept of incremental software delivery. With the load balancer, UE service gets different dimensions to trigger on-demand scaling, for example, traffic load, signaling load and active user numbers etc., each map to a different VNFC. The load balancer may benefit compact resource requirement and usage of C-RAN.

Figure 6A:
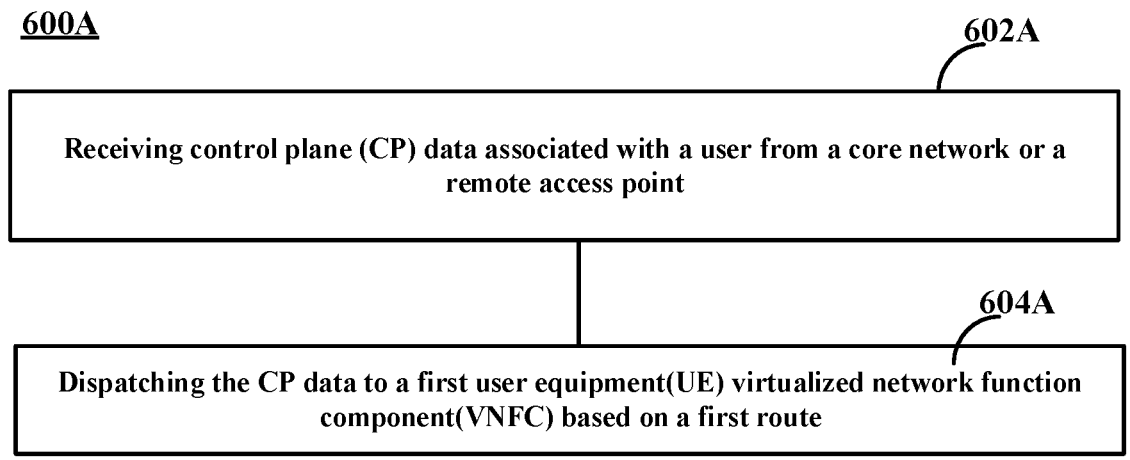
FIG. 6A is a flow chart depicting a method according to an embodiment of the present disclosure.
Figure 6B:
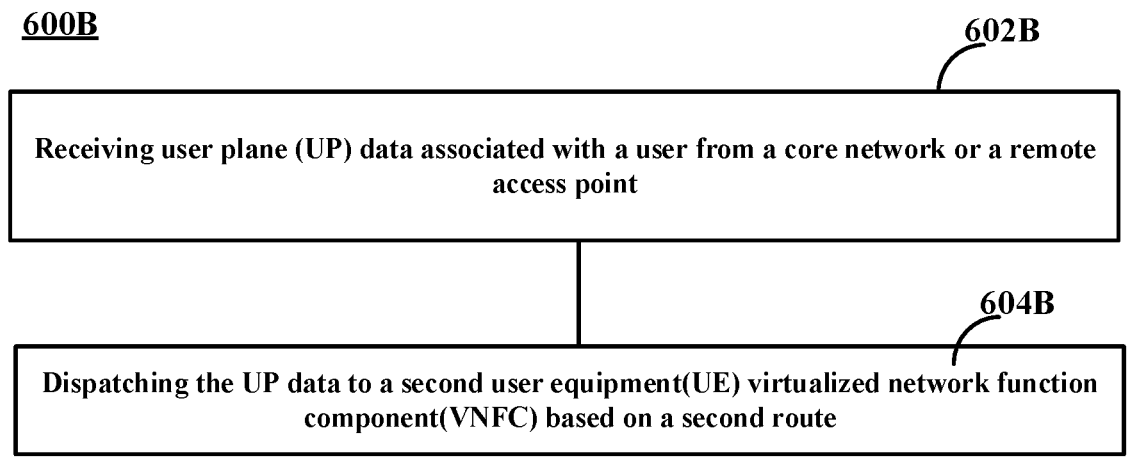
FIG. 6B is a flow chart depicting a method according to another embodiment of the present disclosure.

FIGS. 6A and 6B are flow charts depicting methods according to an embodiment of the present disclosure, which may be performed at an apparatus such as the load balancer as shown in FIGS. 3-5. As such, the apparatus may provide unit for accomplishing various parts of the methods 600A and 600B as well as unit for accomplishing other processes in conjunction with other components.

As shown in FIG. 6A, the method 600A may start at block 602A where the load balancer receives CP data associated with a user from the core network or the RAP. As shown in FIG. 6B, the method 600B may start at block 602B where the load balancer receives UP data associated with a user from the core network or the RAP. For example, at user plane side, an application may create data packets that are processed by protocols such as TCP, UDP and IP, while in the control plane, signaling messages are exchanged between the core network, C-RAN and the UE. The information may be processed by packet data convergence protocol (PDCP), radio link control (RLC) protocol and medium access control (MAC) protocol, before being passed to the physical layer for transmission. The user plane protocol stack between the eNodeB and UE may comprise the following sub-layers: PDCP, RLC and MAC. On the user plane, packets in the core network (such as EPC (Evolved Packet Core)) are encapsulated in a specific EPC protocol and tunneled between the P-GW and the eNodeB. Different tunneling protocols are used depending on the interface. For example, GPRS Tunneling Protocol (GTP) is used on the S1 interface between the eNodeB and S-GW and on the S5/S8 interface between the S-GW and P-GW. The control plane handles radio-specific functionality. For example, the core network such as MME may provide the control plane function for mobility. It is noted that the functionality of the UP and CP may be provided differently in different wireless network. As shown in block 602A and block 602B, the load balancer may receive only CP data, only UP data or both CP data and UP data associated with the user.

At block 604A, the load balancer dispatches the CP data to a first UE VNFC based on a first route. At block 604B, the load balancer dispatches the UP data to a second UE-VNFC based on a second route. The load balancer may generate the route based on a route policy defined by a network administrator for example. The route policy may include a mechanism for selectively applying policies based on access list, user priority, QoS (quality of service), data size, data type, UE VNFC load or other criteria. For example, if the data type is CP data, then the route for the CP data is to the UE CP VNFC. Similarly, if the data type is UP data, then the route for the UP data is to the UE UP VNFC. As another example, if the user has a higher priority, then the route for the data from/to the user may be to the UE VNFC with higher availability. The first UE-VNFC may be same as or different from the second UE-VNFC. For example, if the first UE VNFC processes only the CP data and the second UE-VNFC processes only the UP data, then the first UE-VNFC may be different from the second UE-VNFC. In another example, if a UE-VNFC can process both the CP data and the UP data, then the first UE-VNFC and the second UE-VNFC may be the same UE-VNFC.

In an embodiment, the route is created based on a load of the one or more UE-VNFCs. For example, if there is not a route for the received UP data or CP data, the load balancer may generate the route to the UE VNFC with lowest current load for the received UP data or CP data.

Figure 13:
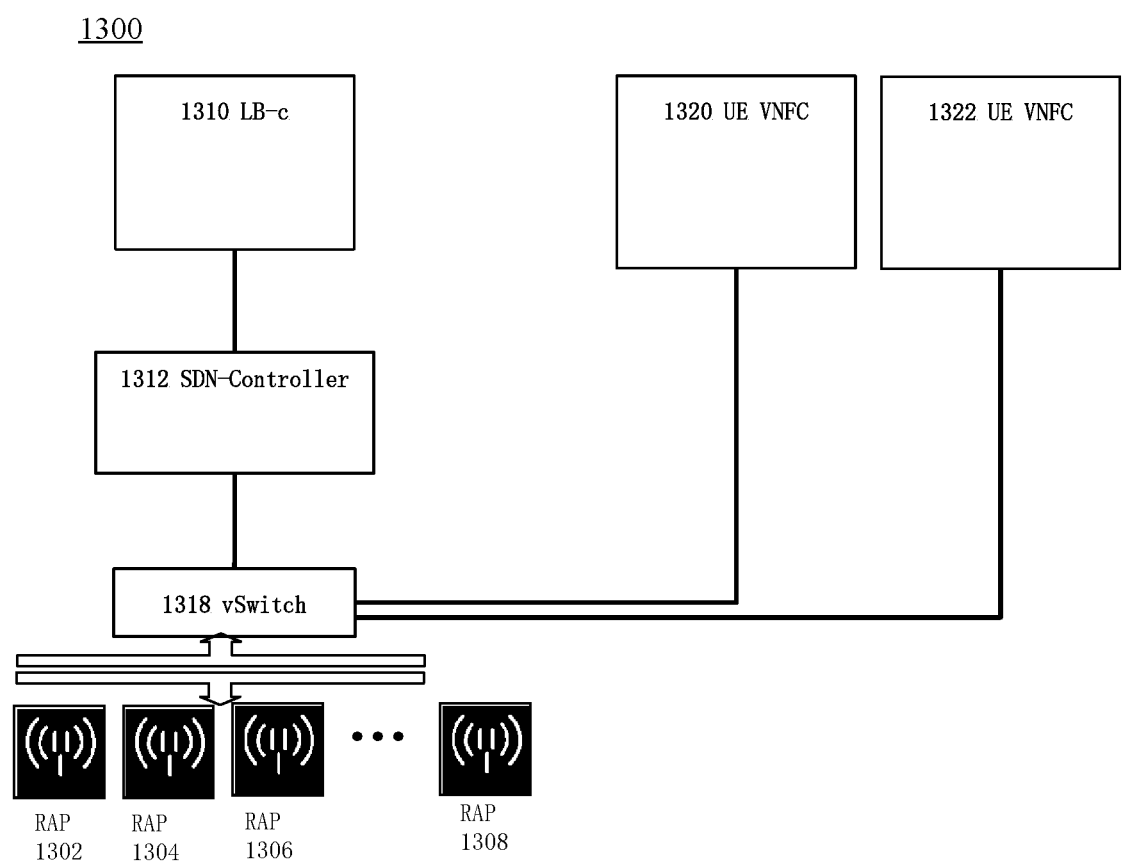
FIG. 13 depicts a schematic system, in which the dispatching functionality of the load balancer is implemented by a SDN vSwitch.

Since before reaching application business logic such as UE VNFC, the traffic may go through the load balance which may result in an additional hop, so extra delay may be added and a new single point of failure may be caused. In an embodiment, the dispatching functionality of the load balancer may be implemented by a software defined networking (SDN) traffic forwarding element such as vSwitch. FIG. 13 depicts a schematic system, in which the dispatching functionality of the load balancer is implemented by the SDN vSwitch. As shown in FIG. 13, LB-c 1310 tells routing rules to a SDN controller 1312 through a SDN northbound interface (NBI), which configures a flow table to vSwitch 1318, then for incoming traffic, vSwitch 1318 may dispatch them to correct UE VNFCs directly. There may be no extra hop and no extra delay any more. In addition, the traffic may be IPSec (IP Security) decrypted before dispatched by the vSwitch 1318. It is noted that there may be a plurality of vSwitchs 1318 each of which may serve at least one RAP.

Figure 7:
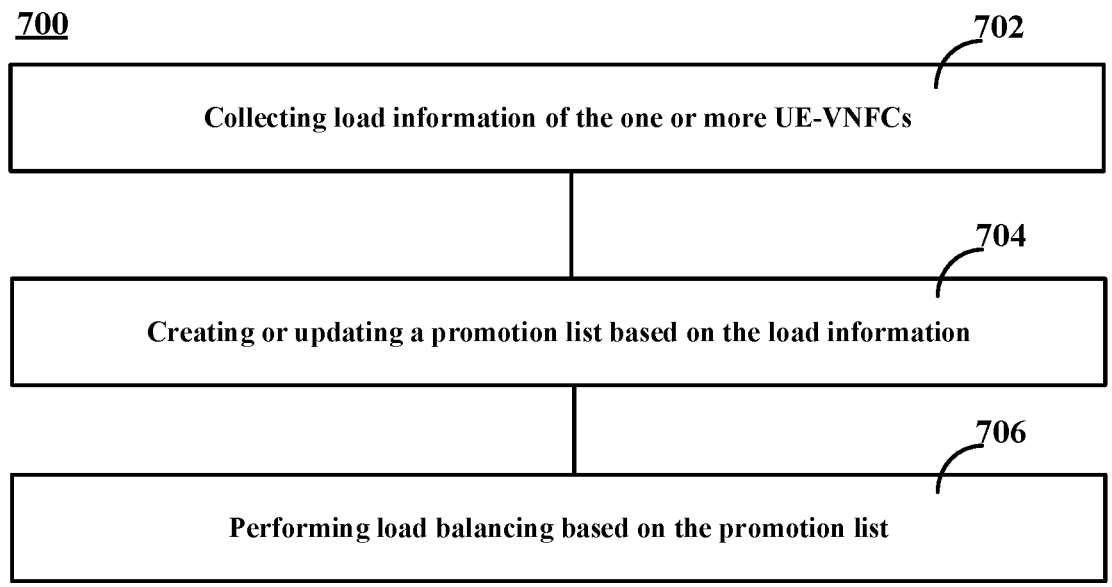
FIG. 7 is a flow chart depicting a method according to another embodiment of the present disclosure.

FIG. 7 is a flow chart depicting a method 700 according to an embodiment of the present disclosure, which may be performed at an apparatus such as the load balancer as shown in FIGS. 3-5. As such, the apparatus may provide unit for accomplishing various parts of the method 700 as well as unit for accomplishing other processes in conjunction with other components.

As shown in FIG. 7, at block 702, the load balancer collects load information of the one or more UE-VNFCs. For example, the load balancer may periodically collect load information of the one or more UE-VNFCs. Alternatively, the one or more UE-VNFCs may report their load information to the load balancer periodically or based on a predefined event, such as the changed load information or in response to a request for the load information.

At block 704, the load balancer create or update a promotion list based on the load information. The promotion list may be a list of VNFC loads that are listed in ascending/descending order.

At block 706, the load balancer performs load balancing based on the promotion list. For example, the route may be created based on the promotion list. As an example, if there is not a route for the received UP data or CP data, the load balancer may select the UE VNFC with the lowest load from the promotion list and generate the route to the selected UE VNFC for the received UP data or CP data.

In an embodiment, the load balancer may save the user's context information which comprises static context information and CP context information. The user's static context may be created or modified during user/bearer setup and may comprise user ID, UE ID, service type, etc. The dynamic context be created or updated during per packet processing and may comprise PDCP sequence number, RLC buffers, etc. For example, during the user accesses to the LTE network, LB-c of the load balancer may store static context of this user into the session database, and the UE VNFC may update the user's dynamic context into the same session database. Usually only user's SRB (signaling radio bearers) related dynamic context may be saved, DRB (data radio bearers) related dynamic context may not be saved, due to performance limit of database's write and read.

In an embodiment, the load balancer may perform deep packet inspection (DPI). DPI can examine the data part of a packet as it passes the load balancer, searching for protocol non-compliance, viruses, spam, intrusions, or defined criteria to decide whether the packet may pass or if it needs to be routed to a different destination, or for the purpose of collecting statistical information. In an embodiment, DPI may be used to identify which user owns the packet.

Figure 8:
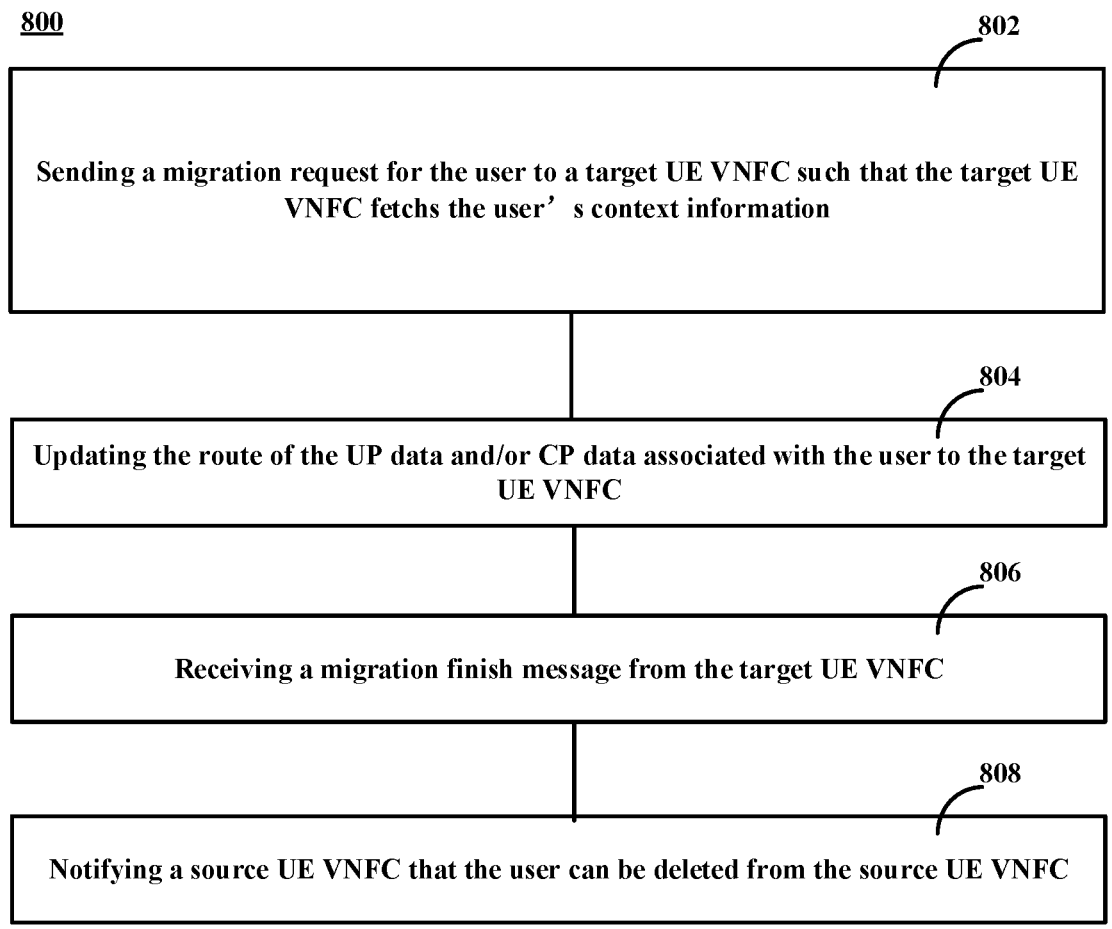
FIG. 8 is a flow chart depicting a method for user migration according to another embodiment of the present disclosure.

FIG. 8 is a flow chart depicting a method for user migration according to an embodiment of the present disclosure, which may be performed at an apparatus such as the load balancer as shown in FIGS. 3-5. As such, the apparatus may provide unit for accomplishing various parts of the method 800 as well as unit for accomplishing other processes in conjunction with other components. In this embodiment, the load balancer can migrate a user from a source UE VNFC to a target UE VNFC.

As depicted in FIG. 8, at block 802, the load balancer sends a migration request for the user to a target UE VNFC such that the target UE VNFC fetches the user's context information. The migration request may comprise any suitable information such as the address of the source UE VNFC. The target UE VNFC may fetch the user's static context information from the session database of the load balance and fetch the user's dynamic context information from the source UE VNFC. Alternatively, the load balancer may trigger the user's context information forwarding to the target UE VNFC.

At block 804, the load balancer updates the route of the UP data and/or CP data associated with the user to the target UE VNFC. For example, if the source UE VNFC processes only the UP data associated with the user, then the load balancer updates the route of the UP data associated with the user to the target UE VNFC; if the source UE VNFC processes only the CP data associated with the user, then the load balancer updates the route of the CP data associated with the user to the target UE VNFC; and if the source UE VNFC processes both the UP data and the CP data associated with the user, then the load balancer updates the route of both the UP data and the CP data associated with the user to the target UE VNFC.

At block 806, the load balancer receives a migration finish message from the target UE VNFC. For example, when the target UE VNFC restores the user's context information and continues processing the UP data and/or CP data associated with the user, the target UE VNFC may send the migration finish message to the load balancer.

At block 808, the load balancer notifies the source UE VNFC that the user can be deleted from the source UE VNFC.

Figure 9:
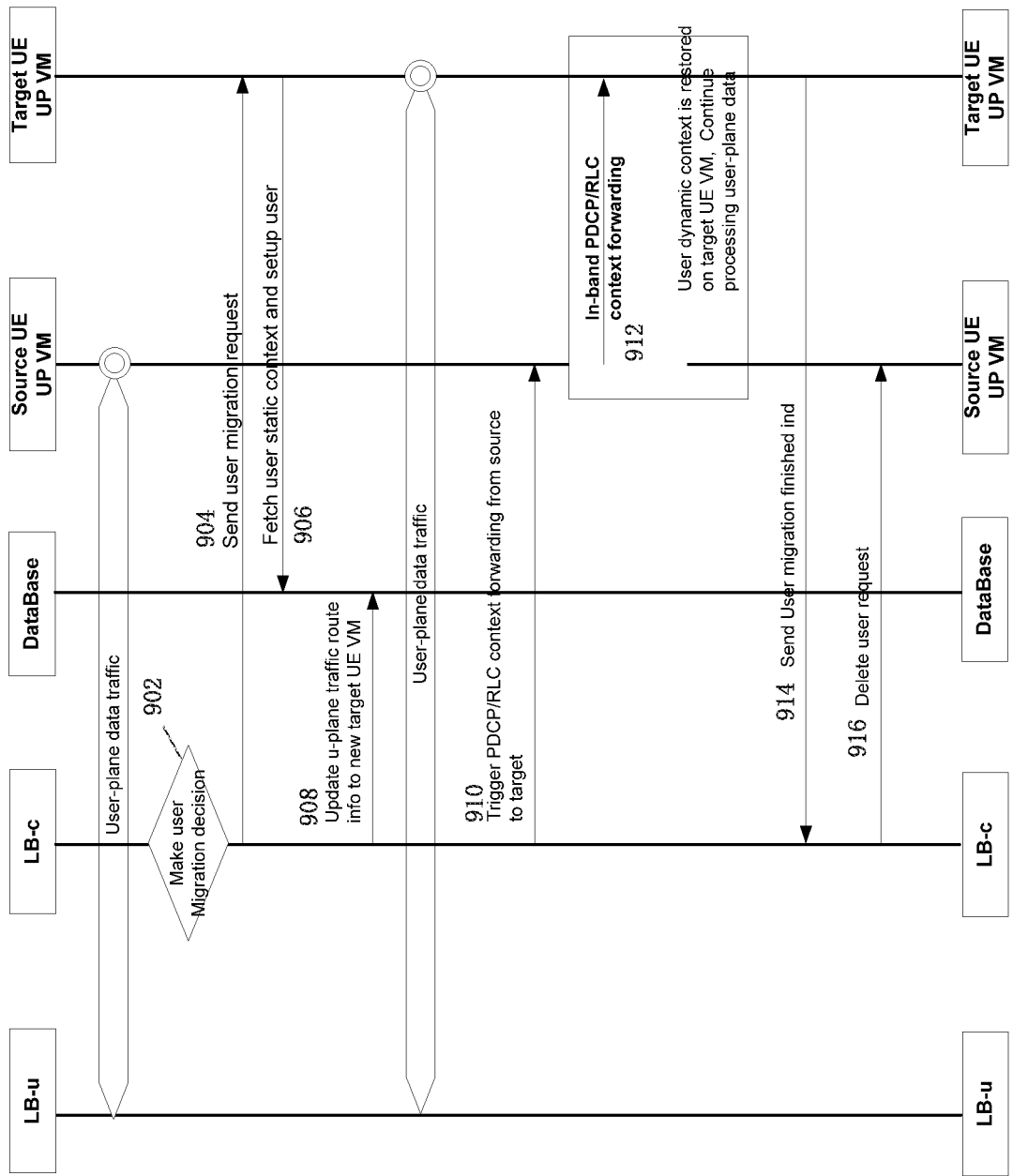
FIG. 9 is a flow chart depicting a method for user migration according to an embodiment of the present disclosure.

FIG. 9 is a flow chart depicting a method for user migration according to an embodiment of the present disclosure.

As depicted in FIG. 9, at block 902, LB-c makes a user migration decision due to various reasons, for example load balancing, maintenance, upgrade, saving power consumption, etc.

At 904, LB-c reads the user's context information from the session DB and sends a user migration request to a target UE VNFC. Or alternative, if there are multiple users to be migrated, LB-c can distribute user identities among new target UE VNFCs based on load situation, and tells each UE VNFC which indexes they shall access in the session database, so that the target UE VNFCs restore UE context information by themselves in parallel.

At 906, the target UE VNFC may fetch the user's static context from the session database and setup the user.

At 908, LB-c updates the traffic dispatch route, so that new incoming traffic may go to the target UE VNFC.

At 910, LB-c sends message to the source UE VNFC for triggering RLC layer data/context forwarding from the source UE VNFC to the target UE VNFC.

At 912, the source UE VNFC may perform in-band PDCP/RLC context forwarding. Then the target UE VNFC may restore the user's dynamic context and continue processing the user-plane data.

Once the data/context forwarding finishes and dynamic user context info is restored successfully on target UE VNFC, the target UE VNFC may send a user migration finish information to LB-c at 914.

At 916, LB-c may send a user deletion request to the source UE VNFC which may delete the user.

The user migration procedure happens inside the scope of load balancer, it has no impacts to outside RAP or core network, as from their perspectives, the communication addresses are unchanged, which are still the address of the load balancer. So, user live migration's impacts are limited inside the scope of load balancer and are self-contained.

Figure 10:
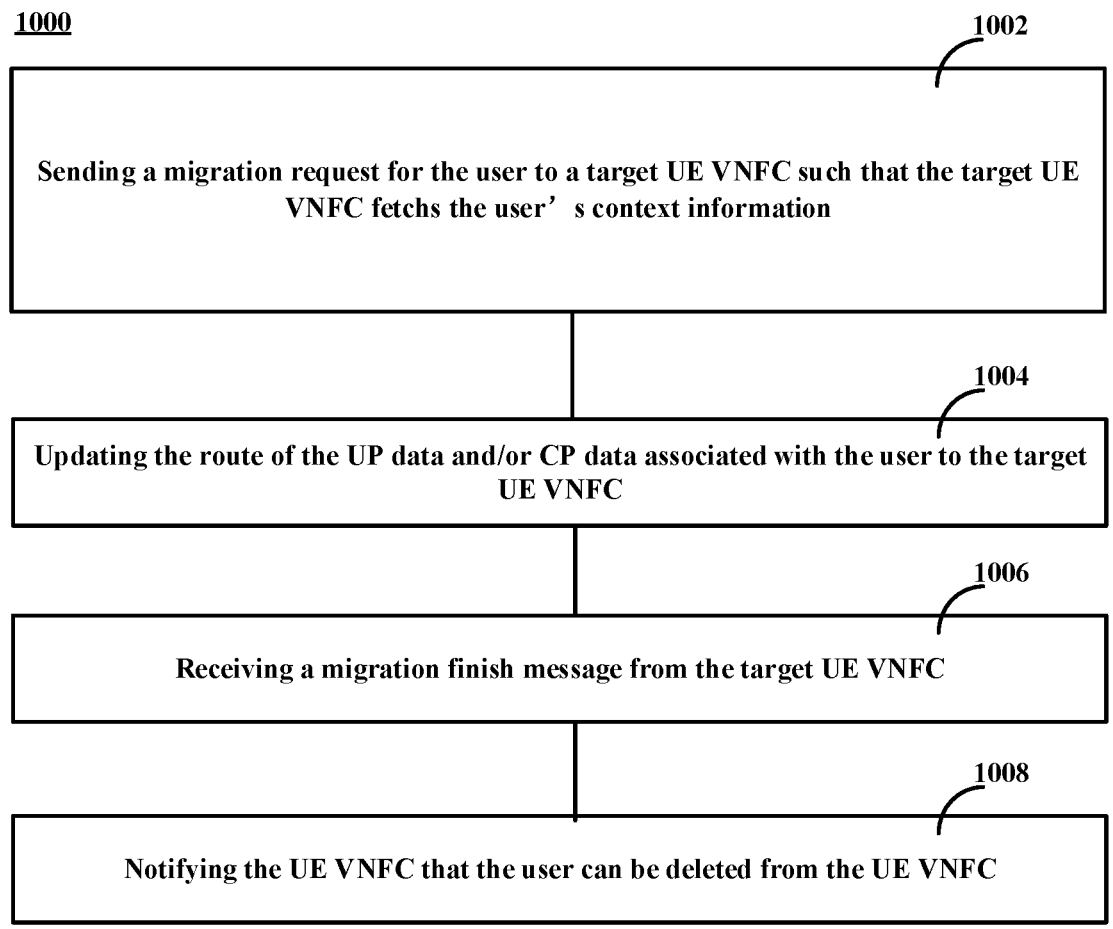
FIG. 10 is a flow chart depicting a method for providing high availability according to another embodiment of the present disclosure.

FIG. 10 is a flow chart depicting a method for providing high availability according to an embodiment of the present disclosure, which may be performed at an apparatus such as the load balancer as shown in FIGS. 3-5. As such, the apparatus may provide unit for accomplishing various parts of the method 1000 as well as unit for accomplishing other processes in conjunction with other components. In this embodiment, the load balancer can guarantee high availability in case of a UE VNFC crashed.

As depicted in FIG. 10, at block 1002, the load balancer detects that the a UE VNFC is crashed. The load balancer may detect that the UE VNFC is crashed in various ways. For example, the load balancer may periodically monitoring the health of the UE VNFCs. The UE VNFC may send a heartbeat message to the load balancer at a predefined time, and if the load balancer can not receive the heartbeat message from the UE VNFC at the predefined time, then the load balancer may detect that the UE VNFC is crashed.

At block 1004, the load balancer sends, for at least one user impacted by the crashed UE VNFC, a user restore request to at least one new UE VNFC such that the at least one new UE VNFC fetches the at least one user's context information. For example, the at least one new UE VNFC may fetch the at least one user's context information from the session DB. In an embodiment, if the crashed UE VNFC is a UE UP VNFC, the load balancer may send a RRC command to respective UEs of the at least one user such that the respective UEs re-syncs respective UP context information with the at least one new UE UP VNFC.

At block 1006, the load balancer updates the route of the UP data and/or CP data associated with the impacted at least one user to the at least one new UE VNFC. For example, if the crashed UE VNFC previously processed only the UP data associated with the impacted at least one user, then the load balancer updates the route of the UP data associated with the impacted at least one user to the at least one new UE VNFC; if the crashed UE VNFC previously processed only the CP data associated with the impacted at least one user, then the load balancer updates the route of the CP data associated with the impacted at least one user to the at least one new UE VNFC; and if the crashed UE VNFC previously processed both the UP data and the CP data associated with the impacted at least one user, then the load balancer updates the route of both the UP data and the CP data associated with the impacted at least one user to the at least one new UE VNFC.

At block 1008, the load balancer receives a user restore finish message from the at least one new UE VNFC.

Figure 11:
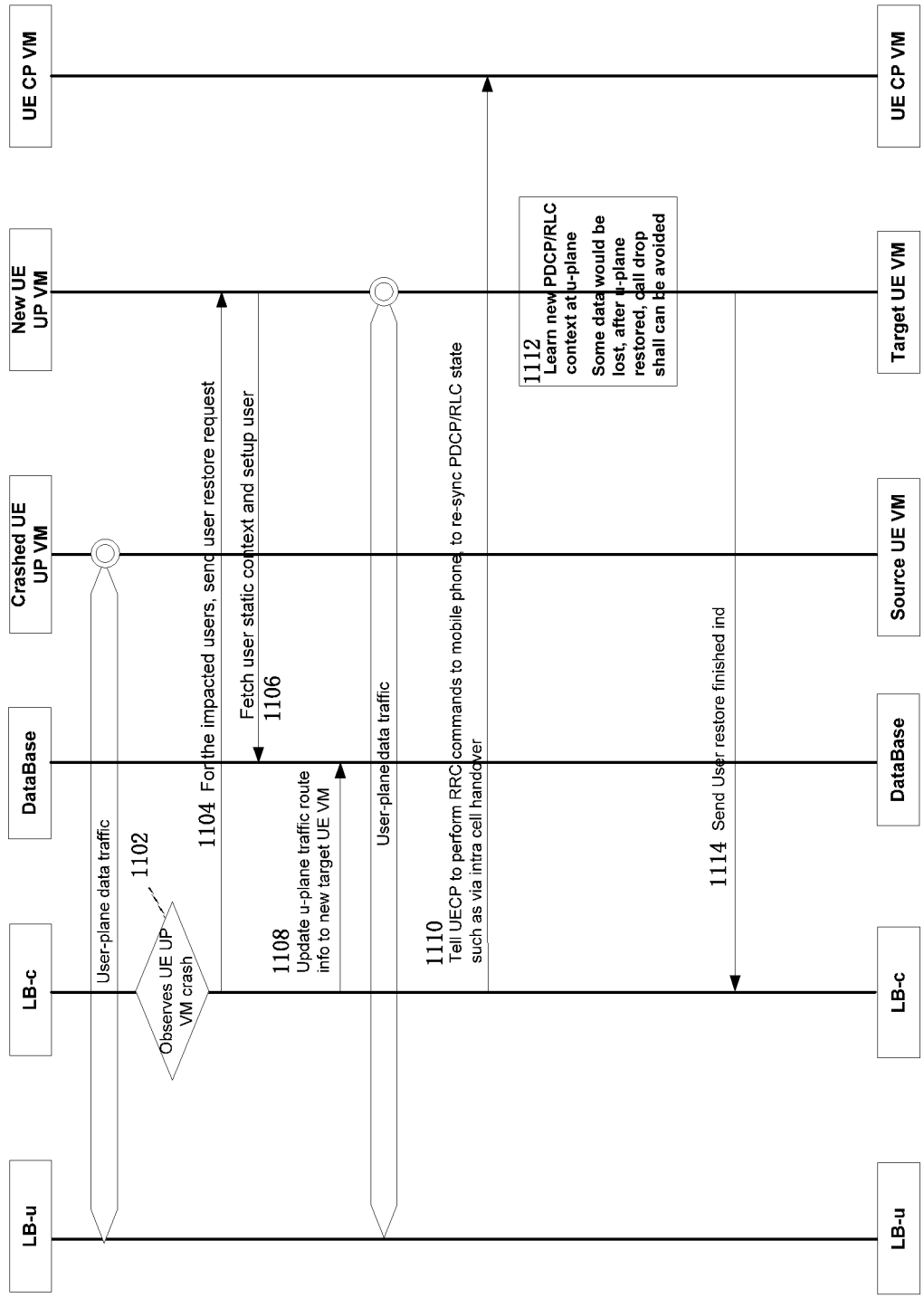
FIG. 11 is a flow chart depicting a process for providing high availability according to an embodiment of the present disclosure.

FIG. 11 is a flow chart depicting a process for providing high availability according to an embodiment of the present disclosure.

As depicted in FIG. 11, at block 1102, LB-c observes that a UE UP VM is crashed.

At 1104, LB-c reads, from session DB, user context information for at least one user impacted by the crashed UE VNFC and sends, for the impacted at least one user, a user restore request to at least one new UE UP VNFC. Or alternative, if multiple users to be restored, LB-c can distribute user identities among multiple new UE UP VNFCs based on load situation, LB-c tells each UE UP VNFC which indexes it shall access in the session database, so that target UE VNFCs come to restore multiple user context information by themselves in parallel. Dynamic user context information of user SRB bears may be stored in the session database, or even further, SRB bears' RLC/PDCP processing are processed on a separated non-crashed UE CP VNFC, so that user's SRBs can be fully recovered or still alive during UE UP VNFC crash.

At 1106, the new UE UP VM fetch the user static context of the impacted at least one user from the session database and setup the impacted at least one user.

At block 1108, LB-c updates the u-plane traffic dispatch routes for the impacted at least one user, so new incoming traffic may go to the new UE VNFC.

There may be data loss on user's DRB bears during the period of original UE VNFC crash, and after LB-c restores user onto the new UE UP VNFC, the dynamic context (such as PDCP sequence number, RLC buffers etc.) on the new UE UP VNFC may be mismatch with the dynamic context on the UEs, this may cause data loss as well. At 1110, LB-c tells the UE CP VNFC to perform RRC command towards UEs to re-sync the PDCP/RLC state with the new UE UP VNFC for DRB by intra cell handover for example.

At 1112, the new UE UP VNFC learns new PDCP/RLC context and continue process the user plane data. Then the new UE UP VNFC may send a user restore finish information to LB-c at 1114.

The u-plane high availability procedure according the embodiments of the present disclosure might be visible to mobile phone/UE, but without impacts to outside RAP or core network, as from their perspectives, the communication addresses are unchanged, which are still load balancer's address.

Figure 12:
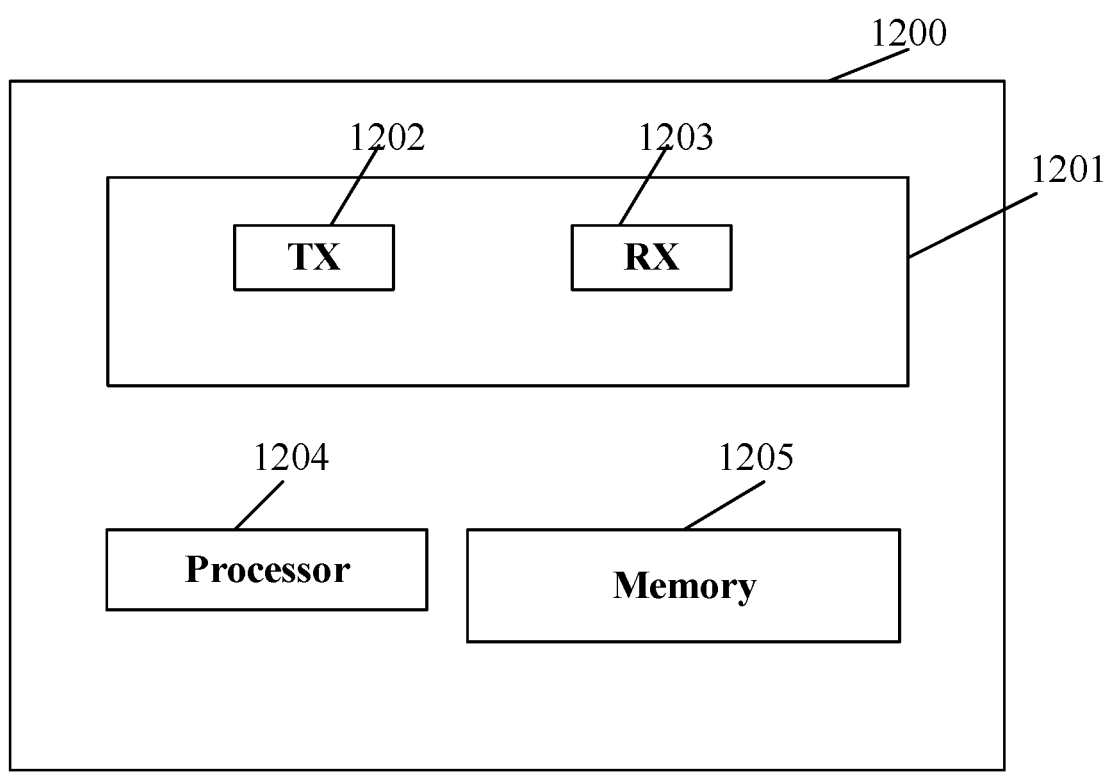
FIG. 12 is a block diagram illustrating an apparatus according to an embodiment of the disclosure.

FIG. 12 depicts an apparatus capable of load balancing in C-RAN as described above, wherein the apparatus may be implemented by or included in the load balancer. As shown in FIG. 12, the apparatus 1200 comprises a processing device 1204, a memory 1205, and a transceiver 1201 in operative communication with the processor 1204. The transceiver 1201 comprises at least one transmitter 1202 and at least one receiver 1203. While only one processor is illustrated in FIG. 12, the processing device 1204 may comprises one or more processors or multi-core processor(s). Additionally, the processing device 1204 may also comprise cache to facilitate processing operations.

Computer-executable instructions can be loaded in the memory 1205 and, when executed by the processing device 1204, cause the apparatus 1200 to implement the above-described methods for load balancing in C-RAN. In particular, the computer-executable instructions can cause the apparatus 1200 to receive control plane (CP) data associated with a user from a core network or a remote access point; and dispatch the CP data to a first user equipment (UE) virtualized network function component (VNFC) based on a first route.

In an embodiment, the apparatus 1200 is further configured to receive user plane (UP) data associated with the user from the core network or the remote access point; and dispatch the UP data to a second UE-VNFC based on a second route, wherein the first UE-VNFC is same as or different from the second UE-VNFC.

In an embodiment, the apparatus 1200 is further configured to collect load information of the one or more UE-VNFCs; create or update a promotion list based on the load information; and perform load balancing based on the promotion list.

In an embodiment, the apparatus 1200 is further configured to save the user's context information which comprises static context information and dynamic context information.

In an embodiment, the apparatus 1200 is further configured to perform deep packet inspection.

In an embodiment, dispatching the CP data to a first UE-VNFC based on a first route comprises dispatching, by a software defined networking (SDN) traffic forwarding element, the CP data to the first UE VNFC based on the first route and dispatching the UP data to a second UE-VNFC based on a second route comprises dispatching, by the software defined networking (SDN) traffic forwarding element, the UP data to the second UE VNFC based on the second route.

In an embodiment, the apparatus 1200 is further configured to send a migration request for the user to a target UE VNFC such that the target UE VNFC fetches the user's context information; update the route of the UP data and/or CP data associated with the user to the target UE VNFC; receive a migration finish message from the target UE VNFC; and notify a source UE VNFC that the user can be deleted from the source UE VNFC.

In an embodiment, the apparatus 1200 is further configured to detect that the UE VNFC is crashed; send, for at least one user impacted by the crashed UE VNFC, a user restore request to at least one new UE VNFC such that the at least one new UE VNFC fetches the at least one user's context information; update the route of the UP data and/or CP data associated with the at least one user to the at least one new UE VNFC; and receive a user restore finish message from the new UE VNFC, wherein if the UE VNFC is a UE UP VNFC, the method further comprises causing respective UEs of the at least one user to re-sync respective UP context information of the at least one user with the at least one new UE UP VNFC.

In an embodiment, the route is created based on a load of the one or more UE-VNFCs.

According to an aspect of the disclosure it is provided an apparatus capable of implementing the methods for load balancing in C-RAN as described above, wherein the apparatus may be implemented by or included in the load balancer.

In an embodiment, the apparatus comprises a receiving unit for receiving control plane (CP) data associated with a user from a core network or a remote access point; and a dispatching unit for dispatching the CP data to a first user equipment (UE) virtualized network function component (VNFC) based on a first route.

In an embodiment, the apparatus further comprises a receiving unit for receiving user plane (UP) data associated with the user from the core network or the remote access point; and a dispatching unit for dispatching the UP data to a second UE-VNFC based on a second route, wherein the first UE-VNFC is same as or different from the second UE-VNFC.

In an embodiment, the apparatus further comprises a collecting unit for collecting load information of the one or more UE-VNFCs; a creating/updating unit for creating or updating a promotion list based on the load information; and a performing unit for performing load balancing based on the promotion list.

In an embodiment, the apparatus further comprises a saving unit for saving the user's context information which comprises static context information and dynamic context information.

In an embodiment, the apparatus further comprises a performing unit for performing deep packet inspection.

In an embodiment, the dispatching unit is implement by a software defined networking (SDN) traffic forwarding element.

In an embodiment, the apparatus further comprises a sending unit for sending a migration request for the user to a target UE VNFC such that the target UE VNFC fetches the user's context information; an updating unit for updating the route of the UP data and/or CP data associated with the user to the target UE VNFC; a receiving unit for receiving a migration finish message from the target UE VNFC; and a notifying unit for notifying the UE VNFC that the user can be deleted from the UE VNFC.

In an embodiment, the apparatus further comprise a detecting unit for detecting that the UE VNFC is crashed; a sending unit for sending, for at least one user impacted by the crashed UE VNFC, a user restore request to at least one new UE VNFC such that the at least one new UE VNFC fetches the at least one user's context information; an updating unit for updating the route of the UP data and/or CP data associated with the at least one user to the at least one new UE VNFC; and a receiving unit for receiving a user restore finish message from the new UE VNFC, wherein if the UE VNFC is a UE UP VNFC, respective UEs of the at least one user is caused to re-sync respective UP context information of the at least one user with the at least one new UE UP VNFC.

In an embodiment, the route is created based on a load of the one or more UE-VNFCs.

According to an aspect of the disclosure it is provided a computer program product comprising at least one non-transitory computer-readable storage medium having computer-executable program instructions stored therein, the computer-executable instructions being configured to, when being executed, cause an apparatus to operate as described above.

According to an aspect of the disclosure it is provided a computer readable storage medium comprising instructions which when executed by at least one processor, cause the at least one processor to perform the method as described above.

The embodiments of the disclosure may have the following advantages. With load balancer (LB), user migrations among UE VNFCs become UE service's internal logic, as LB takes and hides user's external connectivity, no tangles with RAP or core network during migration. Thanks to hiding and user migration, LB makes on-demand scaling of UE VNFCs be seamless, the UE VNFCs' scale-out or scale-in are scoped inside LB, no impact to outside RAP or core network etc. LB facilitates UE VNFCs' high availability (N+M) as well. In addition, LB can define the order to do UE VNFCs' rolling upgrade/fallback, without business service downtime. It further supports the concept of incremental software delivery. With load balancer, UE service gets different dimensions to trigger on-demand scaling, for example, traffic load, signaling load and active user numbers etc., each map to a different VNFC. It benefits compact resource requirement and usage of VNF.

For C-RAN, LB may be a new VNFC, can be deployed in VMs or containers. Load balancer as a common service, loose-coupled with application business logic, can be used for different C-RAN products. LB can use either software defined dispatcher, or SDN vSwitch to dispatch traffic. LB creates a UE service-oriental RAN software, with limited changes to original software, facilitate original software to get such as self-contained, self-scaling, self-healing and self-configured cloud native characteristics. LB facilitates RAN as a service.

It is noted that any of the components of load balancer can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

ABBREVIATIONS

At least some of the following abbreviations may be used in this disclosure. If there is an inconsistency between abbreviations, preference should be given to how it is used above.

RAT Radio Access Technology
RAN Radio Access Network
RAP Remote Access Point
LB Load Balancer
PaaS Platform as a Service
CaaS Container as a Service
IaaS Infrastructure as a Service
VNF Virtualized Network Function
VNFC Virtualized Network Function Components
SDN Software Defined Network
AM Acknowledged Mode
UM Unacknowledged Mode
TBD To Be Define
PS Packet Scheduler
D-PDU Data PDU
ZMQ Zero Message Queue
CCP Centralized Control Plane VNFC
DL Downlink
UE User Equipment
UL Uplink
PHY Physical
PDU Protocol Data Unit
SDU service Data Unit
SRB signalling radio bearers
DRB data radio bearers
Ctrl control
NAS Non-access stratum

What is claimed is:

1. A method, comprising:
    load balancing in a cloud-radio access network, comprising:
        receiving control plane data associated with a user from a core network or a remote access point;
        dispatching the control plane data to a first user equipment virtualized network function component based on a first route;
        collecting load information of one or more user equipment virtualized network function components;
        creating or updating a promotion list based on the load information;
        performing load balancing based on the promotion list;
        receiving user plane data associated with the user from the core network or the remote access point; and
        dispatching the user plane data to a second user equipment virtualized network function component based on a second route,
        wherein the first user equipment virtualized network function component is same as or different from the second user equipment virtualized network function component.

2. The method according to claim 1, further comprising saving context information of the user which comprises static context information and dynamic context information.

3. The method according to claim 1, further comprising performing deep packet inspection.

4. The method according to claim 1,
    wherein dispatching the control plane data to a first user equipment virtualized network function component based on a first route comprises dispatching, by a software defined networking traffic forwarding element, the control plane data to the first user equipment virtualized network function component based on the first route,
    wherein dispatching the user plane data to the second user equipment virtualized network function component based on the second route comprises dispatching, by the software defined networking traffic forwarding element, the user plane data to the second user equipment virtualized network function component based on the second route.

5. The method according to claim 1, further comprising:
    sending a migration request for the user to a target user equipment virtualized network function component such that the target user equipment virtualized network function component fetches context information of the user;
    updating the route of at least one of the user plane data or control plane data associated with the user to the target user equipment virtualized network function component;
    receiving a migration finish message from the target user equipment virtualized network function component; and
    notifying a source user equipment virtualized network function component that the user can be deleted from the source user equipment virtualized network function component.

6. The method according to claim 1, further comprising:
    detecting that a user equipment virtualized network function component is crashed;
    sending, for at least one user impacted by the crashed user equipment virtualized network function component, a user restore request to at least one new user equipment virtualized network function component such that the at least one new user equipment virtualized network function component fetches the at least one user's context information;
    updating the route of at least one of the user plane data or control plane data associated with the at least one user to the at least one new user equipment virtualized network function component; and
    receiving a user restore finish message from the at least one new user equipment virtualized network function component,
    wherein if the user equipment virtualized network function component is a user equipment user plane virtualized network function component, the method further comprises causing respective user equipment of the at least one user to re-sync respective user plane context information of the at least one user with the at least one new user equipment user plane virtualized network function component.

7. The method according to claim 1, wherein at least one of the first route or the second route is created based on a load of one or more user equipment virtualized network function components.

8. An apparatus, comprising:
a processor; and
a non-transitory memory, the memory containing instructions executable by the processor, to cause the apparatus to:
perform load balancing in a cloud-radio access network, wherein the apparatus is caused to:
receive control plane data associated with a user from a core network or a remote access point;
dispatch the control plane data to a first user equipment virtualized network function component based on a first route;
collect load information of one or more user equipment virtualized network function components;
create or update a promotion list based on the load information;
perform load balancing based on the promotion list;
receive user plane data associated with the user from the core network or the remote access point; and
dispatch the user plane data to a second user equipment virtualized network function component based on a second route,
wherein the first user equipment virtualized network function component is same as or different from the second user equipment virtualized network function component.

9. A non-transitory computer readable storage medium comprising instructions which, when executed by at least one processor, cause the at least one processor to:
receive control plane data associated with a user from a core network or a remote access point;
dispatch the control plane data to a first user equipment virtualized network function component based on a first route;
collect load information of one or more user equipment virtualized network function components;
create or update a promotion list based on the load information; and
perform load balancing based on the promotion list;
receive user plane data associated with the user from the core network or the remote access point; and
dispatch the user plane data to a second user equipment virtualized network function component based on a second route,
wherein the first user equipment virtualized network function component is same as or different from the second user equipment virtualized network function component.

10. The apparatus according to claim 8,
wherein the first user equipment virtualized network function component is same as or different from the second user equipment virtualized network function component.

11. The apparatus according to claim 8, wherein the processor and the non-transitory memory contain instructions executable by the processor to cause the apparatus to: save context information of the user which comprises static context information and dynamic context information.

12. The apparatus according to claim 8, wherein the processor and the non-transitory memory contain instructions executable by the processor to cause the apparatus to perform deep packet inspection.

13. The apparatus according to claim 8,
wherein dispatching the control plane data to a first user equipment virtualized network function component based on a first route comprises dispatching, by a software defined networking traffic forwarding element, the control plane data to the first user equipment virtualized network function component based on the first route,
wherein dispatching the user plane data to the second user equipment virtualized network function component based on the second route comprises dispatching, by the software defined networking traffic forwarding element, the user plane data to the second user equipment virtualized network function component based on the second route.

14. The apparatus according to claim 8, wherein the processor and the non-transitory memory contain instructions executable by the processor to cause the apparatus to
send a migration request for the user to a target user equipment virtualized network function component such that the target user equipment virtualized network function component fetches context information of the user;
update at least one of the first route of the user plane data or the second route of the control plane data associated with the user to the target user equipment virtualized network function component;
receive a migration finish message from the target user equipment virtualized network function component; and
notify a source user equipment virtualized network function component that the user can be deleted from the source user equipment virtualized network function component.

15. The apparatus according to claim 8, wherein the processor and the non-transitory memory contain instructions executable by the processor to cause the apparatus to
detect that a user equipment virtualized network function component is crashed;
send, for at least one user impacted by the crashed user equipment virtualized network function component, a user restore request to at least one new user equipment virtualized network function component such that the at least one new user equipment virtualized network function component fetches the at least one user's context information;
update at least one of the first route of the user plane data or the second route of the control plane data associated with the at least one user to the at least one new user equipment virtualized network function component; and
receive a user restore finish message from the at least one new user equipment virtualized network function component,
wherein if the user equipment virtualized network function component is a user equipment user plane virtualized network function component, the method further comprises causing respective user equipment of the at least one user to re-sync respective user plane context information of the at least one user with the at least one new user equipment user plane virtualized network function component.

16. The apparatus according to claim 8, wherein the route is created based on a load of one or more user equipment virtualized network function components.

* * * * *